(12) United States Patent
Zuraw et al.

(10) Patent No.: US 8,101,006 B2
(45) Date of Patent: Jan. 24, 2012

(54) CENTRIFUGAL ATOMIZATION FOR PRODUCING ZINC POWDER

(75) Inventors: Michael J. Zuraw, Bethel, CT (US); Peter B. Harris, Stow, MA (US)

(73) Assignee: The Gillette Company, Boston, MA (US)

( * ) Notice: Subject to any disclaimer, the term of this patent is extended or adjusted under 35 U.S.C. 154(b) by 499 days.

(21) Appl. No.: 12/148,748

(22) Filed: Apr. 22, 2008

(65) Prior Publication Data

US 2009/0263728 A1    Oct. 22, 2009

(51) Int. Cl.
B22F 9/10    (2006.01)
(52) U.S. Cl. .......................... 75/334; 75/354
(58) Field of Classification Search ............ 75/334
See application file for complete search history.

(56) References Cited

U.S. PATENT DOCUMENTS

| | | | |
|---|---|---|---|
| 4,310,292 A * | 1/1982 | Carlson et al. | 425/8 |
| 4,435,342 A | 3/1984 | Wentzell | |
| 4,863,509 A * | 9/1989 | Metz | 75/333 |
| 6,284,410 B1 | 9/2001 | Durkot et al. | |
| 6,423,113 B1 | 7/2002 | Ayers | |
| 7,229,715 B2 | 6/2007 | Costanzo et al. | |
| 2004/0187640 A1 | 9/2004 | Meltzer | |
| 2004/0258995 A1 | 12/2004 | Costanzo et al. | |
| 2008/0199776 A1* | 8/2008 | Henninot et al. | 429/229 |

FOREIGN PATENT DOCUMENTS

| | | |
|---|---|---|
| EP | 1 155 464 B1 | 11/2001 |
| JP | 07245103 | 9/1995 |
| JP | 2007287627 | 11/2007 |
| WO | WO 89/00471 | 1/1989 |

OTHER PUBLICATIONS

C. Dogan and S. Saritas, Metal Powder Production by Centrifugal Atomization, The International Journal of Powder Metallurgy, vol. 30, No. 4 (1994), p. 419-427.
PCT International Search Report, date mailed: Aug. 17, 2009, 4 pages.
Y.Y. Zhao: "Considerations in designing a centrifugal atomiser for metal powder production", Materials & Design, vol. 27, No. 9; Feb. 25, 2005; XP002537418; 6 pages.
Chun-Chen Yang, and Sheng-Jen Lin; "Improvement Of High-Rate Capability Of Alkaline Zn-Mn02 Battery" ; Journal of Power Sources; vol. 112, No. 1; Oct. 24, 2002; XP002537419; 10 pages.

* cited by examiner

*Primary Examiner* — George Wyszomierski
(74) *Attorney, Agent, or Firm* — Vladimir Vitenberg; Barry D. Josephs

(57) ABSTRACT

A centrifugal impact atomization process for producing zinc or zinc alloy powder from molten zinc. A stream of molten zinc is injected onto the surface of a spinning disk contained within an atomization chamber. The disk has a cup shaped cavity having an open end, opposing closed end and integral side walls. The disk may have baffles protruding into the open cavity core within the disk. The baffles may have straight or curved side surfaces. The disk is rotated at high speeds between about 10,000 and 15,000 rpm (revolutions per minute). The oxygen content in the chamber is preferably between about 1 and 6 vol %. Zinc powder is produced having more smaller size particles. Zinc alkaline cells utilizing such zinc product as anode active material show improved performance, especially as power source in high discharge services such as digital cameras.

31 Claims, 5 Drawing Sheets

CENTRIFUGAL ATOMIZATION FOR PRODUCING ZINC POWDER

FIELD OF THE INVENTION

The invention relates to improvements in a centrifugal atomization process for production of zinc or zinc alloy powder suitable for alkaline batteries.

BACKGROUND

Processes are disclosed in the art for converting ingots of metal into a molten state and ultimately converting the molten metal into metal powder. Various methods have been employed. In the basic "gas atomization process" molten metal is passed through a nozzle into an ejection chamber wherein it is mixed with a continuous incoming stream of gas under pressure. The gas serves to atomize the stream of molten metal, which upon cooling converts into a metal powder. A variation of gas atomization ("ultrasonic gas atomization") employs incoming gas injected through a convergent-divergent nozzle at ultrasonic speed into a mixing chamber wherein it is mixed with a spray of molten metal. The impact of the supersonic gas jet on the wall of the chamber produces a shock wave which helps to disintegrate the molten metal into small droplets. The metal droplets solidify outside the chamber into a metal powder upon cooling in a controlled atmosphere. Other methods employ centrifugation to disintegrate an incoming stream of the molten metal into fine liquid droplets which convert to metal powder upon cooling.

In the "centrifugal shot casting process" a batch of the metal is placed into a water cooled crucible. A stationary electrode in proximity to the crucible is activated to an electric arc between the electrode and crucible. This causes sufficient heating to melt the metal. As the crucible spins, centrifugal force causes the molten metal to move up the wall of the crucible. As the molten metal moves to the edge of the spinning crucible it breaks up and is ejected by centrifugal force in the form of droplets, which solidify into metal particles under a controlled atmosphere of argon or helium. This process was originally used to atomize refractory powders for use in nuclear fuels, but it has been used to produce a wide range of metal powders including iron, nickel, cobalt, and titanium.

In the "internally cooled spinning disk atomization" process a stream of molten metal is injected under pressure into a hollow cup shaped cavity within the disk core. Simultaneously a wall of cool liquid quenchant is directed against the inside wall of the cup causing the molten metal to disintegrate into small liquid droplets. The metal powder is formed as the liquid droplets condense in a controlled atmosphere.

In other centrifugal processes "centrifugal atomization" for producing a metal powder from molten metal there are no internal quenching of the molten metal within the cup core. The molten metal may be injected directly into the cup-shaped core of a spinning disk without injecting a quenchant into the cup core. As the disk rotates at high speed the molten metal forms a film on the surface of the cup core. As the film reaches the periphery of the edge of the spinning disk it begins to break up into small droplets. The small liquid metal droplets solidify into a metal powder within a chamber held under a controlled atmosphere. The conventional disk for such atomization process has a cup shaped cavity without any baffles therein. Conventional disk spinning rates for such atomization process for production of zinc powder, is typically between about 500 and 8000 rpm (revolutions per minute), for example between about 1000 and 8000 rpm. With such conventional process and disk spinning rates the typical $D_{50}$ median of the zinc particles produced in a typical batch production is between about 200 and 350 micron. (The $D_{50}$ median and mean average particle size of a batch of zinc particles produced by the atomization process are generally of about the same value, so these terms can effectively be used interchangeably.)

It is desired to improve the mechanical design of the "spinning disk" to reduce the chance of slippage of the molten zinc on the surface of the spinning disk. Slippage results in loss of centrifugal force on a given mass of molten zinc and thus a reduction in kinetic energy as a given mass of molten zinc exits from the edge of the spinning disk and breaks up into liquid droplets. Such loss in centrifugal force can in turn result in larger droplets and consequently larger particle size zinc powder product than is desired.

It is desired to improve the centrifugal atomization process so that a zinc powder having a greater portion of smaller size zinc particles can be produced. Such zinc powder can improve performance in alkaline cells.

SUMMARY OF THE INVENTION

The invention is directed to improvements in the production of zinc or zinc alloy powder for alkaline batteries. Alkaline batteries are well known in the art. They typically have anode comprising particulate zinc and alkaline electrolyte such as aqueous potassium hydroxide, and cathode comprising manganese dioxide or nickel oxyhydroxide or copper oxide. They may also be in the form of zinc/air button cells typically used for hearing aids. A representative alkaline cell employing particulate zinc in the anode is disclosed, for example, in U.S. Pat. No. 6,841,302 B2 and a representative zinc/air cell is disclosed in U.S. Pat. No. 3,897,265. More specifically, the invention is directed to improvement in production of such zinc or zinc alloy powder utilizing a centrifugal atomization method.

In the improved centrifugal atomization method of the invention molten zinc is produced in an electric furnace from solid ingots. The zinc preferably contains zero added mercury so that the mercury content in the zinc is less than about 100 ppm, (parts per million by weight). The zinc may contain alloy additives such as indium, bismuth, aluminum or lead. For example, one or all of indium, bismuth, aluminum and lead may desirably be added to the molten zinc. Indium may be added in amount typically between about 50 and 1500 ppm (parts per million), bismuth in amount between about 5 and 1000 ppm, aluminum in amount between about 5 and 100 ppm, preferably between about 5 and 25 ppm, and lead between about 100 and 1000 ppm, based on the weight of zinc. Preferably there is zero added lead in the molten zinc so that the lead content in the zinc is less than about 100 ppm. (The term zinc as used herein shall be understood to possibly include such zinc alloys.) The molten zinc is transferred from the furnace through a transfer line (launder) to a small electric heated funnel (tundish) which maintains the molten zinc at a temperature of between about 450° C. and 550° C., typically about 500° C.

The molten zinc is ejected from the heated funnel through a nozzle producing a stream of molten zinc which impacts the surface of a spinning disk driven by an electric motor. The disk is housed within an atomization chamber having an atmosphere of relatively low oxygen content, less than about 10 vol. %. Desirably the oxygen content in the atomization chamber is between about 1 and 6 vol %. It has been determined that a desirable oxygen content in the chamber is between about 1.5 and 5.5 vol %, for example, between about 1.5 and 4.5 vol %, or between about 4.0 and 4.5 vol %. The remainder of the gas composition is nitrogen or other gas such as argon, or helium which is nonreactive with zinc. The atmosphere in the atomization chamber is maintained at about atmospheric pressure, typically at a pressure of only slightly above atmospheric, for example, up to about 3 psi ($20.7 \times 10^3$ pascal) above atmospheric pressure. The temperature of the atmosphere in the chamber is between about 75° F. and 140° F., (23.9° C. and 60.0° C.), preferably between about 100° F. and 140° F. (37.8° C. and 60.0° C.) through use of a jacket of circulating coolant or else passing the atomization gas to a heat exchanger and recycling the cooled gas back to the chamber.

Within the atomization chamber a disk of the invention is maintained spinning at rotational speeds between about 10,000 and 15,000 rpm, desirably between about 12,000 and 14,000 rpm (revolutions per minute). As the stream of molten zinc impacts the disk surface a film is developed which covers the exposed disk surface. The molten zinc film moves towards the peripheral edge of the spinning disk at which point it is ejected from the disk by centrifugal force imparting kinetic energy to an ejected mass of molten metal. As it is ejected droplets of molten zinc are formed and become suspended within the chamber. As the droplets cool a product of zinc powder is formed which can be removed from the chamber by an outlet chute.

It has been determined to be advantageous in accordance with the centrifugal atomization process of the invention to run the spinning disk at elevated rotational speeds of between about 10,000 and 15,000 rpm (revolutions per minute), preferably between about 12,000 and 14,000 rpm in combination with oxygen content in the atomization chamber of between about 1 and 6 vol. %, preferably between about 1.5 and 5.5 vol. %, for example, between about 1.5 and 4.5 vol % or desirably between about 4.0 and 4.5 vol %. The disk has a cup shaped cavity therein for receiving molten zinc. The disk may have a cup shaped cavity therein without any baffles. Alternatively, the disk may have integral baffles therein extending from the cavity walls and protruding into the open cavity. Batches of zinc powder may thus be produced by the atomization process of the invention with median $D_{50}$ zinc particle size desirably between about 90 and 135 micron, for example, between about 90 and 120 micron. (The term average particle size of a powder sample as used herein is the $D_{50}$ median particle size as determined by the conventional laser scattering method unless otherwise specified.) The zinc powder produced by the atomization process of the invention may typically have a zinc particle size distribution between about 60 and 510 micron, wherein at least some zinc particles have a size of 60 microns or smaller and less than 1 percent of the zinc particles by weight have a size greater than 510 micron. The zinc powder produced by the atomization process of the invention may typically have a zinc particle size distribution between about 50 and 510 micron, wherein at least some zinc particles have a size of 50 microns or smaller and less than 1 percent of the zinc particles by weight have a size greater than 510 micron. The zinc powder produced by the atomization process of the invention may even have a zinc particle size distribution between about 30 and 510 micron, wherein at least some zinc particles have a size of 30 microns or smaller and less than 1 percent of the zinc particles by weight have a size greater than 510 micron.

The improved atomization process of the invention utilizing higher disk rotation speeds between 10000 and 15000 rpm, preferably between 12000 and 14000 rpm, in combination with chamber oxygen levels preferably between about 1 and 6 vol %, preferably between about 1.5 and 5.5 vol % results in smaller size zinc particles than in conventional operation of such process. The use of such zinc product as active anode material in alkaline cells, for example, alkaline cells with cathodes comprising manganese dioxide, results in improved performance of these cells especially in high rate discharge applications such as a power source for digital cameras. It is not known with certainty, but secondary zinc properties resulting from the improved process of the invention besides smaller particle size, per se, may also be contributing to the improved alkaline cell performance. Such secondary properties of the zinc product herein may include factors such as zinc particle shape distribution, as well as zinc particle surface texture and surface morphology. There can be different zinc particle shapes in the product sample produced by the improved process of the invention. Such zinc particle shapes may include, for example, regular or irregular acicular, regular or irregular polygonal, particles having a combination of straight and arcuate sides, and spherical or substantially spherical. Such secondary physical properties as particular particle shape distributions as well particle surface texture of the zinc powder as made by the process herein could also be contributing to the beneficial properties of this zinc in an alkaline cell. Such properties cannot be readily defined or measured.

The zinc powder made by the improved process of the invention can be used alone or blended with other zinc powder to form a final zinc powder mixture for use as anode active material in an alkaline cell. It is desirable that at least about 50 percent by weight of the zinc powder, for example, at least about 60 percent by weight of the of the zinc powder, which is used as anode active material in an alkaline cell, be made by the improved process of the invention. Preferably between about 50 and 75 percent by weight of the zinc powder, which is used as anode active material in an alkaline cell, is made by the improved process of the invention. The remainder of the zinc powder for the alkaline cell anode may typically be added as zinc fines having an average particle size of 200 mesh (0.075 mm) or smaller or 325 mesh (0.045 mm) or smaller. For example, enough 200 mesh or smaller zinc fines may be added to the zinc powder made by the process of the invention so that the total zinc fines of size 200 mesh or smaller comprises between about 10 and 50 percent by weight of the total zinc powder to be used as anode active material in the alkaline cell. Enough 325 mesh or smaller zinc fines may be added to the zinc powder made by the process of the invention so that the total zinc fines of size 325 mesh or smaller comprises between about 10 and 50 percent by weight of the total zinc powder to be used as anode active material in the alkaline cell. (The referenced mesh size is the conventional Tyler mesh size corresponding to specific sieve square opening in millimeters through which the particles may pass. A Tyler mesh size of 200 corresponds to a sieve square opening of 0.075 mm and a Tyler mesh size of 325 corresponds to a sieve square opening of 0.045 mm in accordance with the U.S.A. Standard Screen ASTME-11 specification.)

In a principal aspect of the invention the disk configuration (for receiving the stream of molten zinc) has no baffles protruding into the cup cavity. The disk, typically of graphite material, has an overall substantially cylindrical shape. The cup shaped cavity within the disk has an open end and opposing closed end with integral side walls therebetween. The closed end of the cup is formed of a flat bottom surface. The cup shaped cavity may have integrally formed straight or sloped side walls. Preferably a portion of the cavity side wall surface is outwardly curved, that is, convex shape when viewed into the cup cavity from the open end thereof. The disk has a top surface at the open end abutting the disk's top peripheral edge. The top surface has a flat portion which extends from the top peripheral edge and transitions to the side walls which form the cup cavity. The cup cavity side walls desirably have an outwardly curved surface portion which transitions into a vertical surface which lies adjacent the cup's closed bottom. The intersection of the cup's side walls and the bottom surface may be slightly inwardly beveled (convex) so that there is a smooth surface at this intersection. Since the cup cavity is contained within the disk body, it has a diameter which is less than the disk overall diameter and a depth which is less than the disk overall depth.

In another aspect of the invention the disk configuration (for receiving the stream of molten zinc) may have a cup shaped cavity with a plurality of integral baffles protruding into the cup cavity. The disk, typically of graphite material, has an overall substantially cylindrical shape. The cup shaped cavity within the disk has an open end and closed end with integral side walls therebetween. The cup shaped cavity may have straight or sloped side walls. Since the cavity is contained within the disk body, it has a diameter which is less than the disk overall diameter and a depth which is less than the disk overall depth. The disk is characterized by a plurality of integrally formed baffles which protrude into said cavity. Specifically, the baffles emanate from the cavity side walls and extend or protrude into said cup shaped cavity within the disk.

The baffles protruding into the cup shaped cavity may have straight side walls or their side walls may be curved. If baffles with curved side walls are employed they are preferably all curved in the same direction. For example, the baffle side walls may be curved inwardly in the direction of disk rotation. The top surface of the baffles may be straight or downwardly sloped. That is, the top surface of the baffle may have a downward slope as it traverses in the direction from the cavity side wall towards the cavity center, as the disk is viewed with open end of said cavity on top.

In one aspect the baffles may have a top surface which is level or at least near level, or substantially level with the top exposed surface of the disk, as when the disk is viewed with the open end of the cavity on top. In another aspect the baffles may have a top surface which is recessed from the disk top surface. That is, the top surface of the baffle may be set below the level of the disk top surface, when the disk is viewed with the open end of the cavity on top.

Thus, if the baffle is in the form having straight side walls and flat top surface, it may typically have a polyhedron shape. For example, it may be substantially in the configuration of a triangular prism. If the baffle is in the form having curved side walls, it may still have an overall shape substantially of that of a polyhedron, except that the side walls may be slightly or moderately curved resembling an arcuate or semispherical surface shape.

The disk designs of the invention having baffles protruding into the disk's cup shaped cavity can serve to reduce centrifugal slippage of the film of molten zinc against the disk surface. Thus, centrifugal energy can be conserved and imparted efficiently to the molten zinc film on the disk surface. This can increase the kinetic energy imparted to a given mass of ejected molten zinc and result in smaller particle size, for a given disk rotation speed compared to a disk without baffles. However at very high disk rotating speeds, e.g. between about 10000 and 15000 rpm a wave-like motion of the molten zinc on the top surface of the disk can be formed. This can result in non-uniformity of flow of the molten zinc over the top surface of the disk and can offset somewhat the benefit of the baffle. The cup shape disk without baffles appears to resist formation of any pronounced wave-like action on the top surface of the disk. Thus, although the disk embodiments of the invention with baffles can be of much benefit, the cup shaped disk without baffles is an effective disk design for production of zinc powder, especially at high rotation speeds of between about 10000 and 15000 rpm.

BRIEF DESCRIPTION OF THE DRAWINGS

The invention is better understood with reference to the drawings in which.

DETAILED DESCRIPTION

Figure 1:
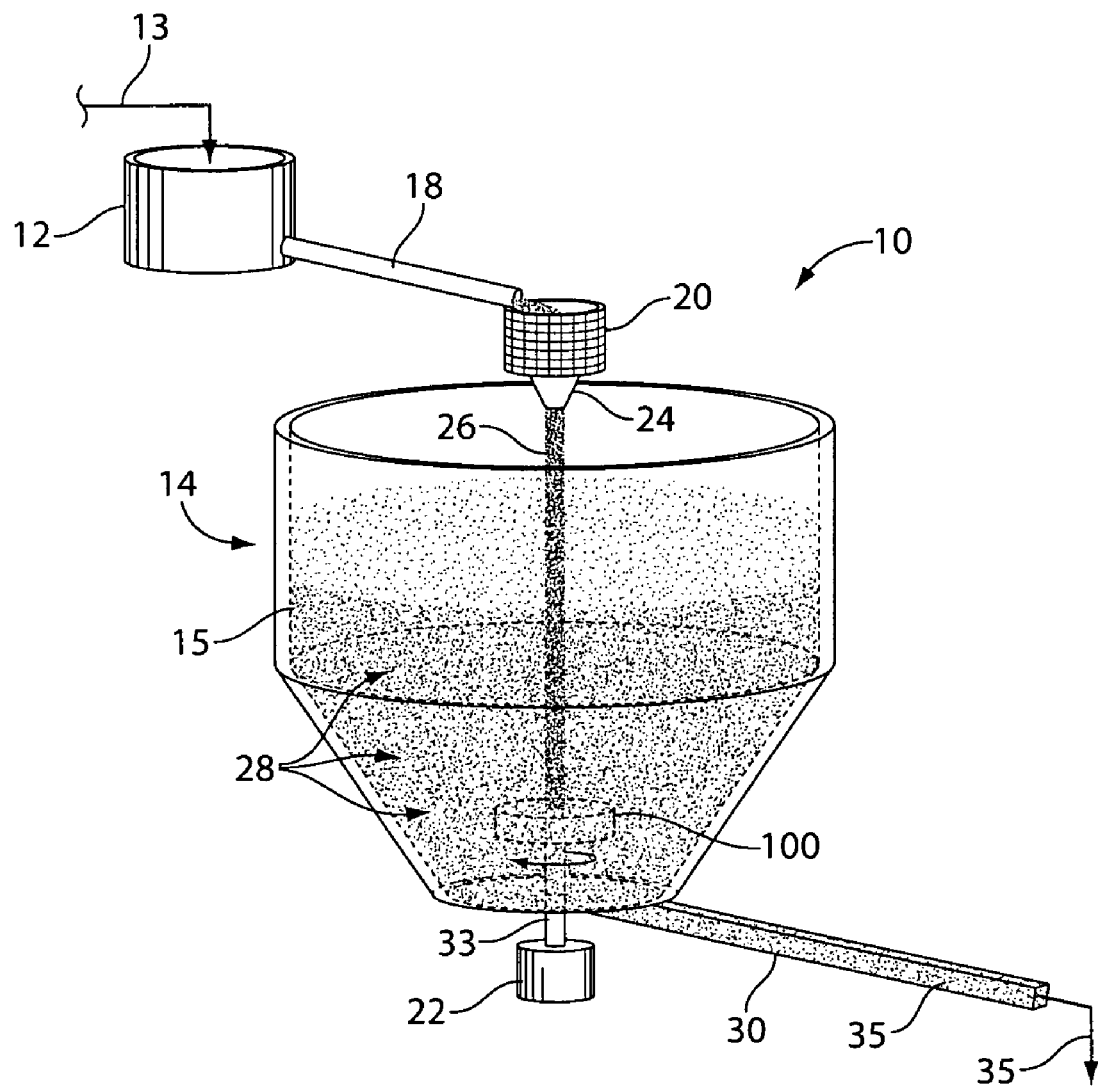
FIG. 1 is a schematic drawing of a centrifugal atomization apparatus.

The centrifugal atomization process and apparatus 10 is shown in the schematic drawing of FIG. 1. In the centrifugal atomization process pure solid zinc ingots 13 are inserted into electric induction furnace 12 and converted to zinc molten metal within furnace 12. (If the zinc is intended for use as anode material for alkaline cells, the alloy additives such as indium and bismuth may be added to the molten zinc in amount typically between about 100 and 1500 ppm indium and between about 100 and 1000 ppm bismuth based on the weight of zinc. Optionally alloy additive lead may also be added in amount typically between about 100 and 1000 ppm based on the weight of zinc.) The particulate zinc alloys which are ultimately produced from the atomization process thus have the electrochemical capacity essentially of pure zinc. Thus, the term "zinc" for use as anode material in alkaline cells shall be understood to include such zinc alloys. Preferably the molten zinc contains zero added mercury and zero added lead. Thus the zinc particles produced contain less that 100 ppm mercury and less than 100 ppm lead.

The molten zinc is then passed from electric furnace 12 through a transfer line 18 ("launder") to a small electric heated funnel 20 ("tundish"). The heated funnel 20 ("tundish") maintains a uniform flow of the molten zinc which then passes through nozzle 24 as a straight, steady stream 26 of molten zinc which impacts onto the central portion of rotating disk 100. Rotating disk 100 is contained within atomization chamber 14 as shown in FIG. 1. An electric drive motor 22 is provided outside of chamber 14 and in communication with drive shaft 33 which causes the disk 100 to rotate at the desired speed. Disk 100 may typically be of graphite, but disk 100 may be comprised of other materials which can withstand high temperature such as tungsten or ceramic material. Disk 100 may have cup shaped cavity 50 (FIG. 2) therein without any baffles protruding into the cavity space. Disk 100 may include internal baffles 110a or 110b which protrude into the cavity space, as shown in FIG. 2A or 2B, respectively. (Alternatively, disk 100 may be replaced with the configuration shown best in FIG. 3A or 3B.) As the molten zinc stream impacts the central portion of rotating disk 100, a molten zinc film is formed on the top surface of disk 100. The molten film mass moves to the peripheral edge of the spinning disk 100 by centrifugal force. As the molten zinc is ejected from the disk surface it forms fine liquid metal droplets 28, which spray into the atomization chamber 14, which is typically constructed of steel. As the molten droplets cool they solidify into zinc or zinc alloy particles, which may be collected as a zinc powder 35 to be removed from chamber 14 through chute 30.

The atomization chamber 14 internal atmosphere is maintained at a relatively low oxygen content, desirably having an oxygen content between about 1 and 6 vol. %, for example, between about 1.5 and 5.5 vol %, for example, between about 1.5 and 4.5 vol %, or desirably between about 4.0 and 4.5 vol %. The remainder of the gaseous atmosphere within chamber 14 may comprise an inert gas, typically nitrogen. However other inert gases (i.e. inert with respect to nonreaction with zinc) such as argon or helium could also be used alone or in admixture or in any mixture with nitrogen. (The oxygen content of the atmosphere within chamber 14 must be controlled so that oxygen does not exceed a level of about 10 vol. % because at higher oxygen content there is a possibility of developing an explosive mixture with the fine spray 28 of molten zinc.) The gaseous atmosphere 15 within chamber 14 may be maintained at atmospheric pressure and desirably at a temperature of between 75° F. and 140° F., (23.9° C. and 60.0° C.) preferably between about 100° F. and 140° F. (37.8° C. and 60.0° C.). This can be achieved by applying a jacket of circulating coolant (not shown) around chamber 14 or else passing the atomization gas to a heat exchanger and recycling the cooled gas back to the chamber 14.

It will be appreciated that the atomization apparatus as above described (FIG. 1) may be scaled up or down in size depending on the rate of throughput of zinc powder desired. An electric drive motor 122 of sufficient power is selected so that disk 100 can be set to rotate at elevated speeds desirably between about 10,000 and 15,000 rpm (revolutions per minute), preferably between about 12,000 and 14,000 rpm. The size and weight of the disk 100 (typically of graphite) is predetermined so that a motor of sufficient horsepower may be selected to drive the disk at the desired rotational speeds.

Specific Embodiments

Figure 2:
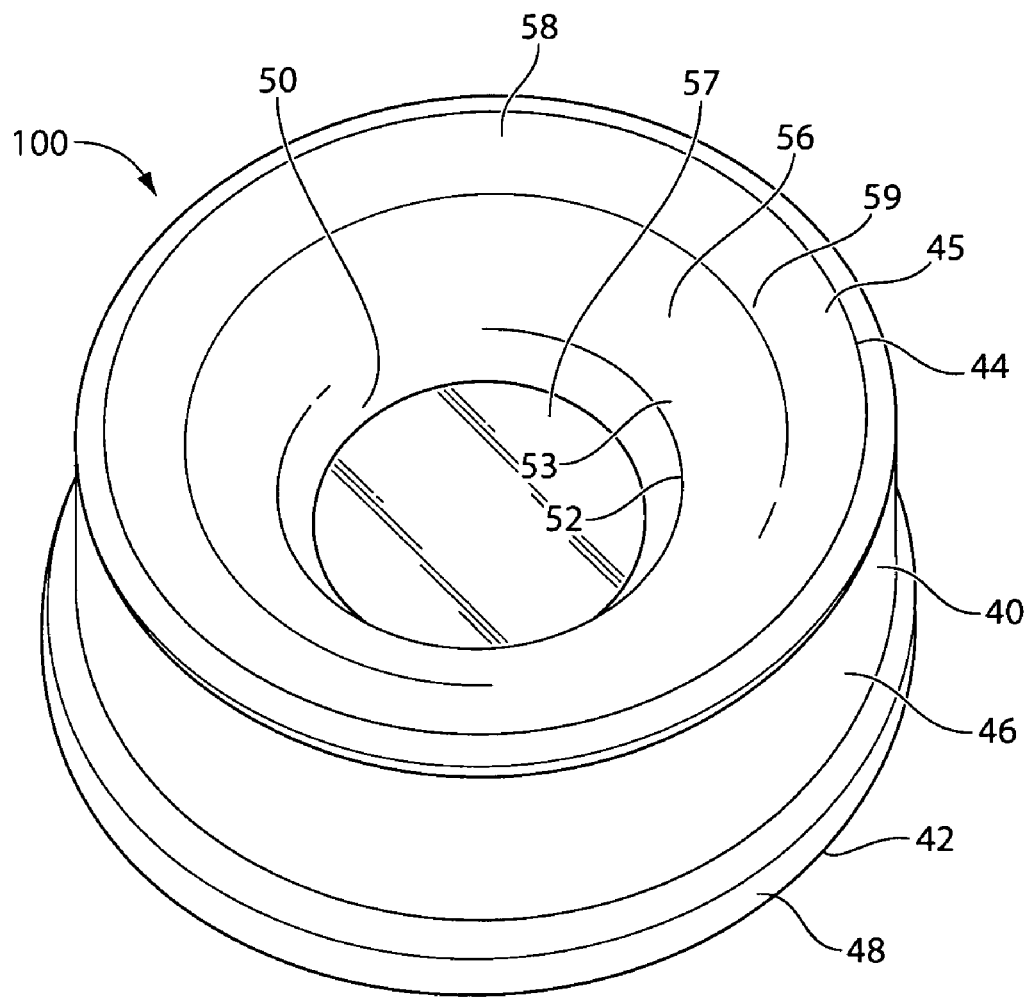
FIG. 2 is am embodiment of a desirable configuration of a rotatable disk for centrifugal atomization, wherein the disk does not have any baffles extending into the cup cavity within the disk.
Figure 2A:
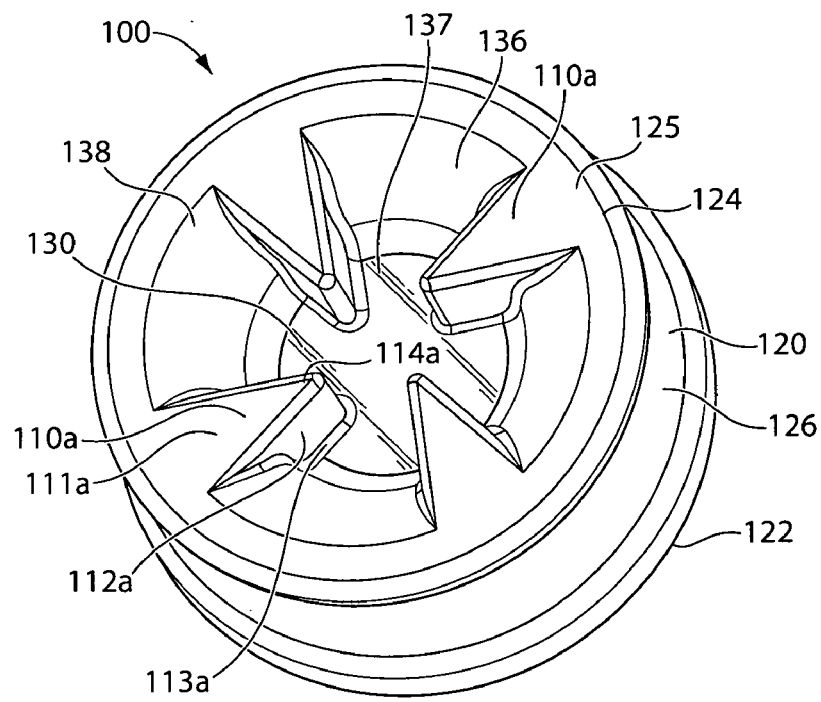
FIG. 2A is an embodiment of another desirable configuration of a rotatable disk for centrifugal atomization, wherein the rotatable disk has full depth straight walled baffles extending into the cup cavity within the disk.
Figure 2B:
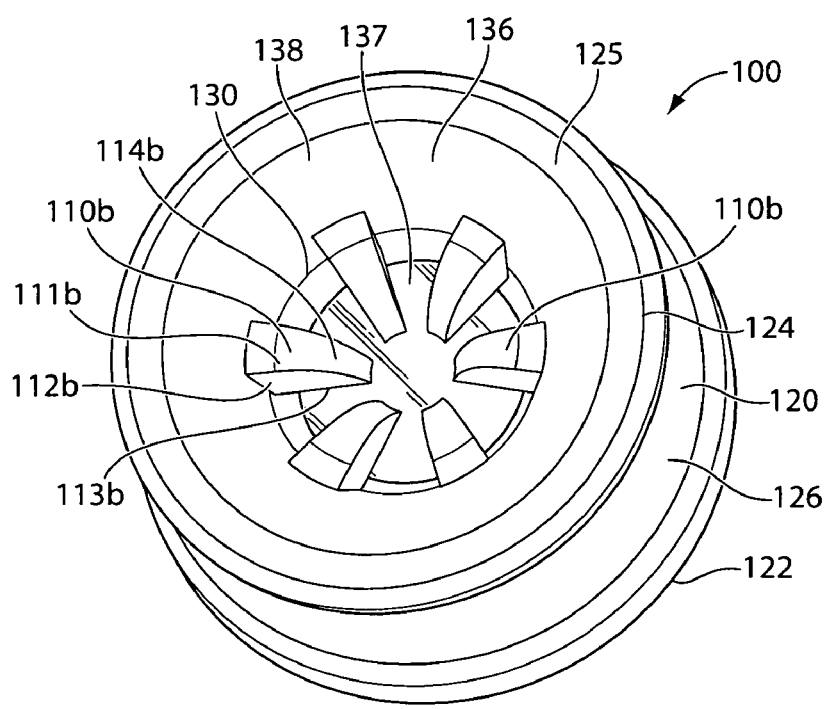
FIG. 2B is an embodiment of an improved rotatable disk for centrifugal atomization, wherein the disk has reduced depth straight walled baffles extending into the cup cavity within the disk.
Figure 3A:
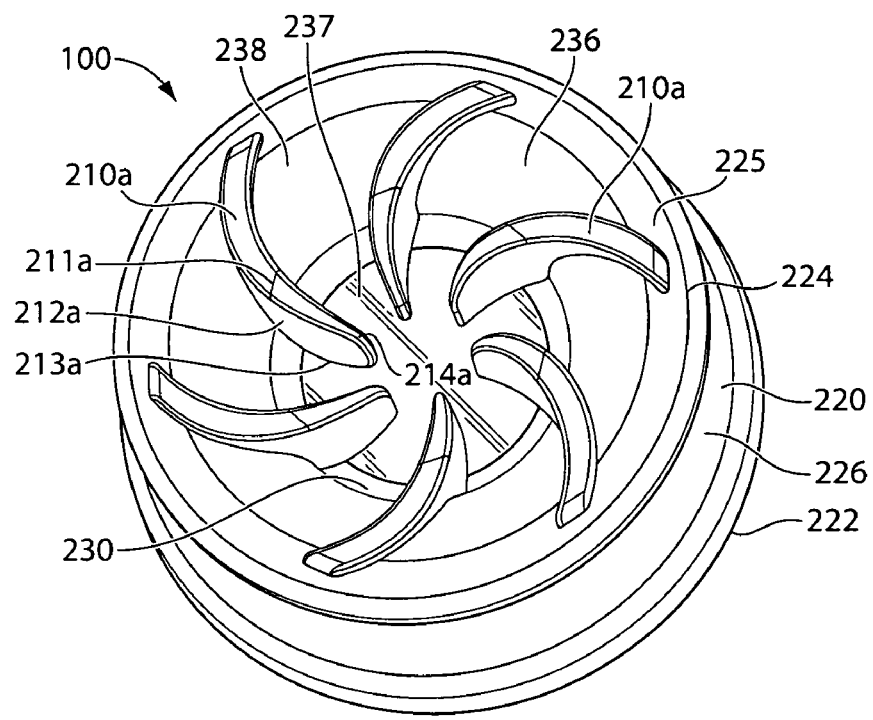
FIG. 3A is an embodiment of an improved rotatable disk for centrifugal atomization, wherein the disk has full depth curved walled baffles extending into the cup cavity within the disk
Figure 3B:
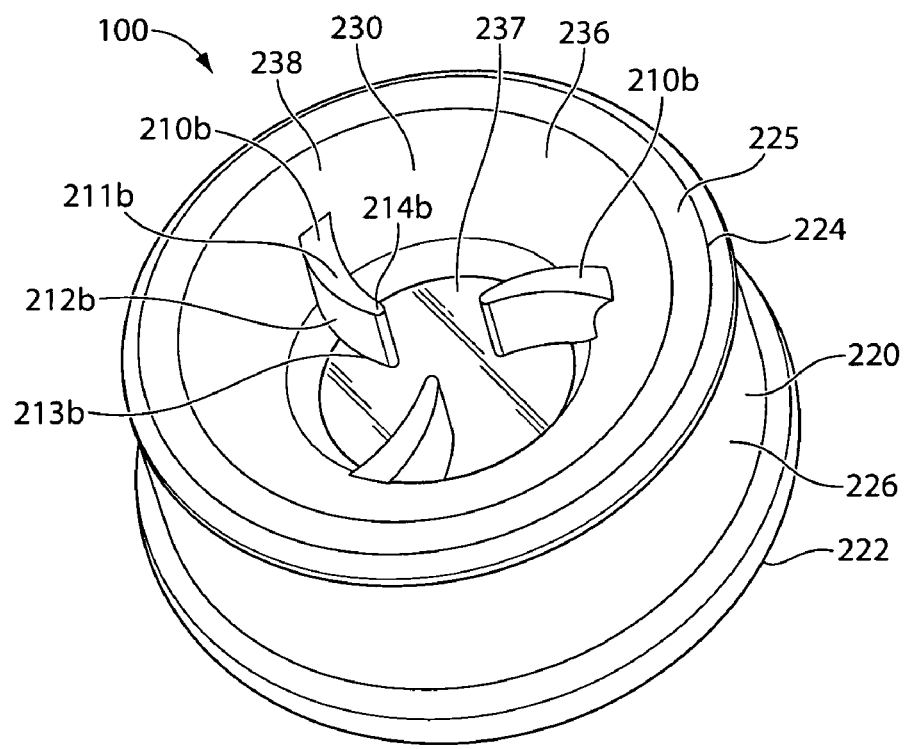
FIG. 3B is an embodiment of an improved rotatable disk for centrifugal atomization, wherein the disk has reduced depth curved walled baffles extending into the cup cavity within the disk.

Preferred embodiments of the of the rotatable disk 100 design are shown in FIGS. 2 to 3B.

A preferred embodiment for disk 100 is best shown in FIG. 2. The disk 100 (FIG. 2) has an open end 58 and opposing closed end 48 and integral side wall 40 therebetween. The disk integral side wall 40 has an outer surface 46 facing the disk exterior and an inside side surface 56 facing the disk interior. The disk 100 has an overall substantially cylindrical shape. There is a cup shaped cavity 50 within disk 100. The cavity 50 is bounded by bottom surface 57, opposing open end 58 and integral side walls 56. There is, thus, a thickness of solid disk material between the disk's outside side surface 46 and inside side surface 56. Side wall outer surface 46 is bounded at its bottom by bottom edge 42 which circumvents disk closed end 48, and side wall outer surface 46 is bounded at its top by top edge 44 which circumvents open end 58. There is a top peripheral surface 45 of disk 100 (FIG. 2) which extends into cavity 50 from circumferential top edge 44. The top peripheral surface 45 transitions into cup cavity side walls 56 by integral sloped transition surface 59 therebetween. The transition surface 59 is preferably outwardly curved, that is, convex shape, when viewed from the open end of the disk. In a desirable specific embodiment the disk 100 (FIG. 2) outside diameter as defined by outer surface 46 may be about 4.75 inches, the cavity bottom surface 57 may be about 2.60 inches, and the depth of cup shaped cavity 50 may be about 1.0 inch. The top surface 45 may optionally have a small flat portion of about 0.1 inches as measured from top edge 44. The flat portion of top surface 45 transitions into outwardly curved surface 59 which may have a radius of curvature of between about 0.8 and 1.0 inches. The outwardly curved transition surface 59 terminates in a small depth vertical surface 53 adjacent the cup's bottom surface 57. There may be a slightly inwardly beveled (concave) surface 52 at the intersection of the cup's side wall 56 and cup's bottom surface 57.

An alternative embodiment for disk 100 is shown in FIG. 2A. The disk 100 has a closed end 137 and opposing open end 138 and integral side wall 120 therebetween. The disk 100 has an overall substantially cylindrical shape. There is a cup shaped cavity 130 within disk 100. The cavity 130 is bounded by bottom surface 137, opposing open end 138 and integral side walls 136. The disk integral side wall 120 has an outer surface 126 facing the disk exterior and an inside side surface 136 facing the disk interior. Inside side surface 136 also forms the side wall of cavity 130. There is, thus, a thickness of solid disk material between the disk's outside side surface 126 and inside side surface 136. Side wall surface 126 is bounded at its bottom by bottom edge 122 which circumvents disk closed end 137, and side wall surface 126 is bounded at its top by top edge 124 which circumvents open end 138 (FIG. 2A). There is a top peripheral surface 125 of disk 100 which extends into cavity 130 from circumferential top edge 124. The improved disk 100 of the invention is characterized by a plurality of integral baffles 110a which has a leading edge 114a extending from the inside side wall surface 136 into cup cavity 130.

Baffles 110a are substantially in the shape of a polyhedron. In the embodiment shown in FIG. 2A baffles 110a are substantially in the shape of a polyhedron more specifically resembling a triangular prism. Thus the baffle 110a (FIG. 2A) has a flat substantially triangular top surface 111a and flat (noncurved) side surfaces 112a extending downwardly therefrom. The vertical depth of a representative baffles 110a is measured from its top surface 111a to its bottom surface 113a. The baffles 110a as shown in FIG. 2A are further characterized by their vertical depth traversing the full depth of cavity 130. That is, the vertical depth of a representative baffle 110a (FIG. 2A) traverses the full depth of cavity 130 as measured from the floor 137 of cavity 130 up to top surface 125. In a variation of this embodiment there may be a space between the bottom surface of baffle 110a and floor 137 of cavity 130. In such case the vertical depth of baffle 110a will be less than the depth of cavity 130. However, in such embodiment the top surface 111a of baffle 110a will still be level or at least nearly or substantially level with top peripheral surface 125 of disk 100 as shown in FIG. 2A.

Another alternative embodiment of disk 100 is shown in FIG. 2B. In this embodiment a plurality of representative baffles 110b are employed which are similar to baffles 110a as above described. The principal difference between baffles 110b (FIG. 2B) and 110a (FIG. 2A) is that baffles 110b are recessed, that is they are displaced from top surface 125 of disk 100. Therefore, the top surface 111b of baffles 110b are not level with the disk top surface 125 but rather top surface 111b is located below the disk top surface 125. The bottom surface 113b of baffle 110b may contact floor 137 of cavity 130 or alternatively bottom surface 113b may be spaced away from floor 137. The configuration of baffles 110b (FIG. 2B) are otherwise the same of similar to that of baffles 110a (FIG. 2A). That is, baffles 110b may have the same shape as baffles 110a. However, in a preferred embodiment shown in FIG. 2B the top surface 111b of baffles 110b are curved downwardly so that leading edge 113b is at level further into disk cavity 130 than baffle top surface 111b. Thus, the vertical depth of baffle 110b as measured as the distance between top surface 111b and bottom surface 113b is greater near the disk's inside wall 136 than it is at the baffle's leading edge 114b.

In another embodiment of the invention the disk may be in the configuration shown in FIGS. 3A and 3B. These embodiments are similar to the embodiments shown in FIGS. 2A and 2B, respectively, except that the baffles have curves side surfaces. Thus, in the embodiment shown in FIG. 3A disk 100 has the following features:

The disk 100 has a closed end 237 and opposing open end 238 and integral side wall 220 therebetween. There is a cup shaped cavity 230 within disk 100. The cavity 230 is bounded by bottom surface 237, opposing open end 238 and integral side walls 236. The disk side wall 220 has an outer surface 226 which forms the outer side surface of disk 100 and an inner side surface 236 which forms the side wall surface bounding cavity 230 within the disk 100. There is, thus, a thickness of solid disk material between the outer side surface 226 and inner side surface 236. Outer side surface 226 is bounded at its bottom by bottom edge 222 which circumvents disk closed end 237, and side surface 226 is bounded at its top by top edge 224 which circumvents open end 138 (FIG. 2A). There is a top peripheral surface 225 of disk 100 which extends into cavity 230 from circumferential top edge 224. The improved disk 100 of the invention is characterized by a plurality of integral baffles 210a which has a leading edge 214a extending from the inside side wall surface 236 into cup cavity 230.

Baffles 210a are substantially in the shape of a polyhedron except that the side surfaces 212a are slightly or moderately curved resembling an arcuate or semispherical surface shape as shown in FIG. 3A. Preferably there are a pair of opposing curved side surfaces 212a, one being of convex shape and the opposing surface of concave shape as shown in FIG. 3A. In the embodiment shown in FIG. 3A baffles 210a are substantially in the shape of a polyhedron more specifically resembling a triangular prism, except that side walls 212a are slightly or moderately curved resembling an arcuate or semispherical surface shape. Thus the baffle 210a (FIG. 2A) may have a flat or substantially flat top surface 211a and a pair of curved opposing side surfaces 212a extending downwardly therefrom. (Top surface 211a may also have a downward slope as it traverses in the direction from wall 236 and towards the center of cavity 230.) Baffles 210a have side walls 212a which are preferably all curved in the same direction as shown in FIG. 3A. In the configuration shown in FIG. 3A the baffle side walls 212a are all curved inwardly in the direction of disk rotation, namely counterclockwise direction. The vertical depth of a representative baffles 210a is measured from its top surface 211a to its bottom surface 213a. The baffles 210a as shown in FIG. 3A are further characterized by their vertical depth traversing the full depth of cavity 230. That is, the vertical depth of a representative baffle 210a (FIG. 3A) traverses the full depth of cavity 130 as measured from the floor 237 of cavity 230 up to top surface 225. In a variation of this embodiment there may be a space between the bottom surface of baffle 210a and floor 237 of cavity 230. In such case the vertical depth of baffle 210a will be less than the depth of cavity 230. However, in such embodiment the top surface 211a of baffle 210a will still be level or at least nearly or substantially level with top peripheral surface 225 of disk 100 as shown in FIG. 3A.

Another alternative embodiment of disk 100 is shown in FIG. 3B. In this embodiment a plurality of representative baffles 210b are employed which are similar to baffles 210a as above described. Thus, baffles 210b are substantially in the shape of a polyhedron but with the side surfaces 212b slightly or moderately curved resembling an arcuate or semispherical surface shape as shown in FIG. 3B. The principal difference between baffles 210b (FIG. 3B) and 210a (FIG. 3A) is that baffles 210b are recessed, that is, they are displaced from top surface 225 of disk 100. Therefore, the top surface 211b of baffles 210b are not level with the disk top surface 225, but rather top surface 211b is located below the disk top surface 225. The bottom surface 213b of baffle 210b may contact floor 237 of cavity 230 or alternatively bottom surface 213b may be spaced away from floor 237. The shape and configuration of baffles 210b (FIG. 3B) may otherwise be the same of similar to that of baffles 210a (FIG. 3A). In the preferred embodiment shown in FIG. 3B the top surface 211b of baffle 210b may be flat or substantially flat. Alternatively, top surface 211b may optionally be curved or sloped downwardly as it traverses in the direction from wall 236 and towards the center of cavity 230. Baffles 210b have side walls 212b which are preferably all curved in the same direction as shown in FIG. 3B. In the configuration shown in FIG. 3B the baffle side walls 212b are all curved inwardly in the direction of disk rotation, namely counterclockwise direction.

EXAMPLE

A rotatable disk 100 (FIG. 2, 2A or 2B) or disk 100 (FIG. 3A or 3B) of the invention may be employed in the centrifugal atomization process (FIG. 1). The rotatable disk 100 embodiment shown in FIG. 2 does not have any internal baffles protruding into cup cavity 50. Rotatable disks 100 embodiments shown in FIGS. 2A and 2B or FIGS. 3A and 3B have integrally formed internal baffles which protrude into the cup shaped cavity within the disk core from the sides walls forming the cup cavity.

A desirable embodiment of the disk 100 with baffles protruding into the cup cavity is shown in FIGS. 2A and 2B. The internal baffles may have a preferred configuration 110a and 110b shown in FIGS. 2A and 2B, respectively. Another desirable embodiment of the disk 100 with baffles protruding into the cup cavity is shown in FIGS. 3A and 3B. The internal baffles may have a preferred configuration 210a and 210b shown in FIGS. 3A and 3B, respectively. As above described, molten zinc or molten zinc alloy is injected from nozzle 24 into cup shaped cavity 50 (FIG. 2) or cup shaped cavity 130 (FIGS. 2A and 2B) or cup shaped cavity 230 (FIG. 3A or 3B). The cup shaped cavity into which molten zinc is injected may typically have a diameter between about 3 and 8 inches (7.6 and 20.3 cm) and a depth between about 0.5 and 2.0 inches (1.3 and 5.1 cm). The disk 100 (all embodiments) is desirably rotated at a speed between about 10000 and 15000 rpm, preferably between about 12000 and 14000 rpm (revolutions per minute). Such disks and disk rotation speeds can be employed effectively for production of zinc powder at a rate typically between about 1000 and 5000 lbs/hr. The $D_{50}$ median particle size of the zinc powder 35 produced from the process can typically be between about 80 and 350 micron.

By way of a nonlimiting example, the atomization chamber 14 may be designed to accommodate a production of zinc powder at a rate of about 3000 pounds per hour. In order to produce such production of zinc powder, the disk 100 (FIG. 2) of disk 100 (FIG. 2A or 2B) or alternatively a disk 100 (FIG. 3A or 3B) may have an overall diameter, for example, between about 5 and 7 inches (12.7 and 17.8 cm). The cup shaped cavity 50 (FIG. 2) or cup shaped cavity 130 (FIG. 2A or 2B) may have a diameter of between about 3 and 4 inches (7.6 and 10.2 cm) and a depth of between about 1 and 2 inches (2.5 and 5.1 cm). The motor 22 of sufficient power is selected to allow disk 100 to spin at between about 10,000 and 15,000 rpm (revolutions per minute). In this context the chamber 14 diameter at its widest section may typically be about 28 ft. The molten zinc may be at a temperature of between about 450° C. and 550° C., typically about 500° C. as it passes as a steady stream from nozzle 24 to impact the surface of spinning disk 100. The chamber atmosphere 15 may comprise desirably between about 1 and 6 vol. % oxygen, preferably between about 1.5 and 5.5 vol %, preferably between about 1.5 and 4.5 vol % or between about 4.0 and 4.5 vol % with the remainder nitrogen. Chamber atmosphere 15 may be maintained at atmospheric pressure and at a temperature of about 75° F. and 140° F., (23.9° C. and 60.0° C.) preferably between about 100° F. and 140° F. (37.8° C. and 60.0° C.) through use of a jacket of circulating coolant (not shown) or else passing the atomization gas to a heat exchanger and recycling the cooled gas back to the chamber 14. The zinc or zinc alloy powder product 35 produced in this manner may be collected and transported from chamber 14 through outlet chute 30. The zinc powder may have a median $D_{50}$ particle size, as determined by laser scattering method, typically between about 80 and 150 micron.

The disks 100 embodiments (FIGS. 2 to 3B) rotated at speeds between about 10,000 and 15,000 rpm, preferably between about 12,000 and 14,000 rpm within atomization chamber 15 with oxygen content between about 1 and 6 vol %, preferably between about 1.5 and 5.5 vol %, for example, between about 1.5 and 4.5 vol % can produce zinc powder having a $D_{50}$ median particle size desirably in a range between about 80 and 150 micron. The zinc powder produced may have a zinc particle size distribution between about 14 and 510 micron, wherein at least some zinc particles have a size of 14 microns or smaller and less than 1 percent by weight of the zinc particles have a size greater than 510 micron. The zinc powder produced may typically have a zinc particle size distribution between about 30 and 510 micron, wherein at least some of the zinc particles have a size of 30 microns or smaller and less than 1 percent of the zinc particles have a size greater than 510 micron.

Figure 4:
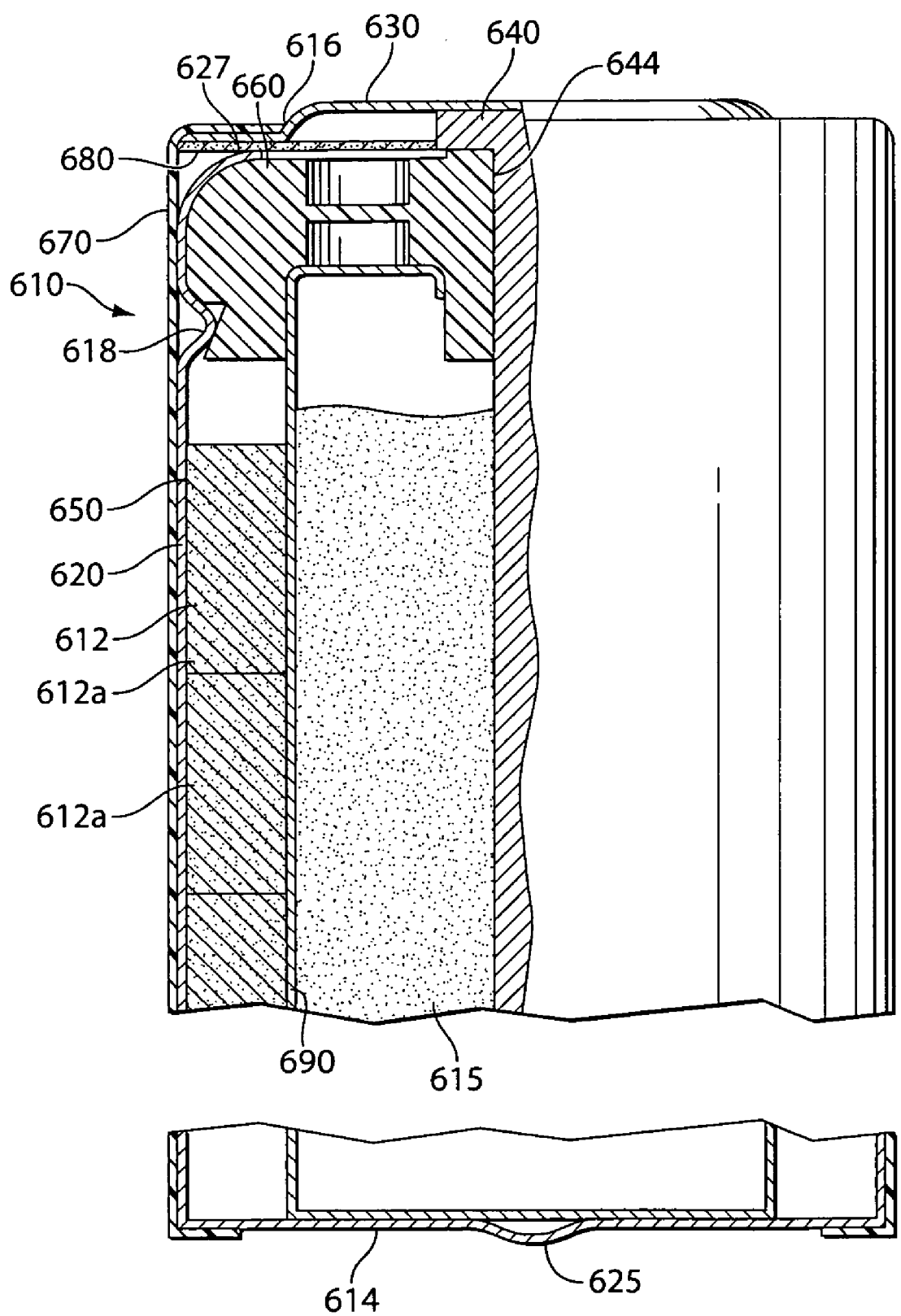
FIG. 4 is a cross-sectional cut away view of an alkaline cell having an anode with zinc powder therein made by the atomization process of the invention.

Performance of AA Alkaline Cells Employing the Zinc Powder Made by the Process of the Invention Primary AA size cylindrical alkaline cells (50×14 mm) as shown in representative FIG. 4 were prepared with anode comprising particulate zinc and cathode comprising particulate manganese dioxide. The AA cell 610 is prepared with a cell casing 620 formed of steel which is plated on the inside and outside surface with nickel. The inside surface of the casing can be coated with a conductive material for example, with carbon.

The cathode 612 in the cell desirably had the following composition:

Electrolytic manganese dioxide (80-90 wt %), graphite (3-10 wt %), and a 7-10 Normal ("aqueous KOH solution between about 30-40 wt % KOH concentration") (5-7 wt %).

The test AA cells and comparative AA cells used in the experiments had comparable cathode compositions and cathode loadings, namely the same amount of cathode material in in the cell. The cathodes were similar in composition with each of the cathode components at the same composition value within the above ranges.

The anode material 615 in each case comprises: Zinc alloy powder 62 to 72 wt % (99.9 wt % zinc containing indium), aqueous KOH solution comprising (32-36 wt % KOH and about 2 wt % ZnO); CARBOPOL C940 (B.F. Goodrich) cross linked acrylic acid polymer gelling agent (between 0.5 and 2 wt %) and Waterlock A-221 (Grain Processing Co.) hydrolyzed polyacrylonitrile grafted unto starch backbone (between 0.01 and 0.5 wt. %; RM-510 (Rhodia) dionyl phenol phosphate ester surfactant (50 ppm); indium trichloride (100-200 ppm). The anode material 615 contained zero added mercury and zero added lead. Thus the mercury content and lead content in the anode was less than about 100 ppm mercury and less than about 100 ppm lead.

Batches of test AA cells and comparative AA cells used in the experiments herein had the same anode composition and loading and same electrolyte. That is, the anodes were identical in composition with each of the anode components at the same specific value within the above ranges. However, the zinc particles in each of the test batch of cells and the comparative batch of cells were different in size distribution and had somewhat different physical characteristics as well (shape and surface features), since the zinc particles in the anode were made using different process parameters in carrying out the centrifugal atomization process of the invention.

In preparing the zinc particles for the batches of test AA cells and for the comparative AA cell the rotating disk configuration 100 as shown in FIG. 2 was employed in all of the tests. As shown in FIG. 2 this embodiment of disk 100 did not have any baffles extending into cup cavity 50. Disk 100 configuration (FIG. 2) was thus used in making the zinc particles for the test cells and comparative AA cells. Disk configuration 100 as shown in FIG. 2 appeared to give the best consistent results over the range in high rotating speeds employed in accordance with the invention, namely, between about 10000 and 14000 rpm, preferably 12000 and 14000 rpm (rotations per minute) in combination with an oxygen content in the atomization chamber 14 between about 1 and 6 vol %, preferably between about 1.5 and 5.5 vol %. The alternative disk designs with baffles therein as shown in FIGS. 2A-3B are based on modeling resulting in operable embodiments at the desired high disk rotation speeds of between about 10000 and 14000 rpm, preferably between about 12000 and 14000 rpm. These disk embodiments can produce a zinc powder with beneficial properties for use as anode material in an alkaline cell. However, the disk 100 design as shown in FIG. 2 is desirable because it is a simpler design and gives excellent consistency of zinc product with improved discharge properties at the atomization process conditions of the invention, including the high disk rotating speeds between about 10000 and 14000 rpm, preferably between about 12000 and 14000 rpm.

In particular the disk design 100 as shown in FIG. 2 as employed in the atomization process of the inventions utilizing high disk rotating speeds, preferably between about 12000 and 14000 rpm and chamber oxygen content preferably between about 1.5 and 5.5 vol. % leads to a zinc powder product having more smaller size zinc particles which helps to achieve improved discharge properties in an alkaline cell. As a result the alkaline cells, in particular $Zn/MnO_2$ alkaline cells, employing such zinc product appear to exhibit longer service life, especially at the high pulsed drains required by digital cameras. It will be appreciated that the zinc product as produced by the atomization process of the invention can be further mixed with other zinc powder, for example, zinc fines of less than about 200 mesh size (75 micron), preferably less than 325 mesh size (45 micron) to further enhance the discharge properties of the zinc powder. (See, e.g. U.S. Pat. No. 6,284,410 B1). Thus, the performance of the zinc powder produced by the atomization process of the invention could be further enhanced by mixing such zinc powder with zinc fines so that the total zinc particles for use in an alkaline cell anode comprises at least 10 weight percent, e.g. between about 10 and 50 weight percent zinc particle size of 200 mesh (75 micron) or smaller. Alternatively, zinc fines may be added to the zinc powder produced by the atomization process of the invention so that the total zinc particles for use in an alkaline cell comprises at least 10 weight percent, e.g, between about 10 and 50 weight percent zinc particle size of 325 mesh (45 micron) or smaller.

A representative alkaline cell is shown in FIG. 4 to reflect the test cells and comparative cell basic configuration. The alkaline cell 610 (AA size) comprises a cylindrical steel casing 620, having a closed end 614 and an open end 616. The cell is filled with cathode 612 comprising $MnO_2$, and an anode 615 comprising zinc particles and electrolyte. The electrolyte comprises a conventional mixture of KOH, ZnO and gelling agent. The cathode 612 is supplied in the form of a series of compacted annular blocks 612a. The anode and cathode is separated by a conventional ion porous separator 690 comprising a cellophane laminated to a nonwoven cellulosic fibrous material. After cell 610 is filled an insulating plug 660 is inserted into open end 616. Insulating plug 660 may be of polypropylene, talc filled polypropylene, sulfonated polyethylene or nylon. The insulating plug 660 used in the test and comparative cells herein was of nylon. The plug 660 is preferably snap fitted around circumferential step 618 as shown in FIG. 4 so that the plug locks in place into the open end 616. The peripheral edge 627 of casing 620 is crimped over the top of insulating plug 660. A paper insulating washer 680 is applied over the crimped peripheral edge 627 of casing 620. Insulating washer 680 can be a polyethylene coated paper washer. A terminal end cap 630 is welded to the head of current collector 640. An elongated current collector 640 is then inserted (force fitted) into aperture 644 of insulating plug 660 so that end cap 630 comes to rest against insulating washer 680. Current collector 640 can be selected from a variety of known electrically conductive metals found to be useful as current collector materials, for example, brass, tin plated brass, bronze, copper or indium plated brass. The current collector 640 used in the test and comparative cells was of tin plated silicon bronze. Conventional asphalt sealant may be preapplied around the current collector 640 before it is inserted into aperture 644. A film label 670 can be applied around casing 620. The terminal end cap 630 becomes the negative terminal of alkaline cell 610 and pip 625 at the closed end of casing 520 becomes the positive terminal. The cells were all balanced in conventional manner so that the mAmp-hr capacity of $MnO_2$ (based on 370 mAmp-hr per gram $MnO_2$) divided by the mAmp-hr capacity of zinc alloy (based on 822 mAmp-hr per gram zinc alloy) is about 1.

Identical AA size test cells and comparative cells were made with same anode and cathode composition, same alkaline KOH electrolyte, and same cell components and cell construction, as above indicated, except that the zinc in the anode of the test cells were made by the atomization process herein described utilizing specific process parameters of the invention. The zinc used in the comparative AA cell had a conventional zinc powder blend which had a zinc particle size distribution between about 140 and 900 micron, with a $D_{50}$ median particle size of about 290 micron. The zinc powder used in the anodes of the test cells and comparative cells were alloyed with the same amount of indium, about 150 ppm. The anodes in the test cells and comparative cells contained zero added lead and zero added mercury.

Digital Camera Test Protocol

Fresh AA test cells (which contained zinc powder made by the atomization process of the invention) and the comparative AA cell (which utilized the above indicated conventional battery grade zinc powder) were subjected to a Digicam discharge protocol. The Digicam (digital camera discharge protocol) tends to mimic the power needed to take and view pictures in conventional digital cameras. The Digicam protocol is a series of pulsed discharge cycle with each cycle consisting of a discharge at 1.5 Watt for 2 seconds, followed by 0.65 Watt discharge for 28 seconds. These cycles are repeated 10 times followed by 55 minutes rest. Then the cycles are repeated until the cutoff voltage of 1.05 is reached. The total number of pulsed cycles (corresponds to number of 1.5 watt pulses) required to reach the cutoff voltage was recorded for each of the comparative cell and each of the test cells. The relative Digicam results for each of the cells tested are presented in Table 1 (the comparative cells results are defined as 100).

Test Results in Table 1

In Table 1 are presented the principal process parameters which resulted in the production of the zinc powder used in each of the batches of AA test cells (Batches A-E). Specifically, the high rotation speed of disk 100 (FIG. 2) along with the oxygen content employed in atomization chamber 15, which were used in producing the zinc powder for each of the test cell batches (A-E) are given in Table 1. Specific physical properties of the resulting zinc powder produced and used for each of the test cell batches (A-E) is given in Table 1. These properties include the zinc particle $D_{50}$ median size as well as the D1, D10 and D25 particle size of the zinc powder. (A $D_{10}$ designation, for example, of 60 micron, indicates that there would be less than 10 wt % of the zinc particles of smaller than 60 micron in the sample.) Also included in Table 1 is the apparent density (bulk density), $g/cm^3$ of the zinc powder produced as well as their average BET surface area, $cm^2/g$.

It was interesting to note that the conventional battery grade zinc powder as used in the comparative AA cell had a size distribution between about 125 and 900 micron. By contrast the zinc powder produced in the atomization process utilizing specific process parameters of the invention, as indicated in Table 1, resulted in a zinc powder product which had a particle size distribution between about 50 or 60 micron up to about 510 micron. Less than 1 percent of the zinc particles have a particle size greater than about 510 micron and at least some of the particles had a size of 60 or 50 microns or smaller. Importantly as shown in The $D_{25}$ values for the zinc product made by the atomization process utilizing process parameters of the invention, typically about 25 wt % of the zinc particles in the product have a particle size less than 100 micron. Most of the D25 values presented in Table 1 are below a value of about 90 micron, which indicates that 25 wt % of most of the zinc powders produced in the atomization process of the invention have a particle size smaller than about 90 micron. There are thus more smaller zinc particles and fewer larger zinc particles in the zinc powders produced by the atomization process of the invention by comparison to the commercial battery grade zinc powder which was used in the comparative AA alkaline cell. This underscores the value of employing a greater percentage of smaller size zinc particles in the anode of alkaline cells in order to achieve better high rate performance. Although this was also indicated in commonly assigned U.S. Pat. No. 6,284,410 B1, the atomization process herein described utilizing the process parameters of the invention reflects a specific method by which a zinc powder can be produced with a greater percentage of the desirable smaller size zinc particles therein.

This means that a zinc powder having a greater percentage of smaller size zinc particles such as zinc particles of size less than 100 micron (zinc fines), for example, between about 30 and 100 micron size can be made in one process, namely the atomization process herein described. Batches of zinc powder may thus be produced by the atomization process of the invention with median $D_{50}$ zinc particle size between about 90 and 135 micron. As a result, a zinc powder having improved discharge properties when used in the anode of an alkaline cell can be produced without incurring the added expense of adding zinc fines produced by some other process. If it is desired to add zinc fines (200 mesh or smaller or 325 mesh or smaller) from some other source then, less of these zinc fines will be needed, thus reducing the cost of producing the final zinc powder for use in the alkaline cell.

Table 1 which shows the benefit of employing zinc powder for the alkaline cell, wherein the zinc powder is made by the atomization process of the invention is as follows:

TABLE 1

Cell Performance for Test Alkaline AA Cells Using Zinc Powder Made By Atomization Process Utilizing Process Parameters of the Invention

| Test Cell | Relative Pulses Cycles to 1.05 V | Disk Speed, rpm | Chamber Oxygen Vol. % | Zinc Particle Size, micron[1] | | | | Bulk Density gm/cc | BET Surface cm$^2$/g |
|---|---|---|---|---|---|---|---|---|---|
| | | | | D1 | D10 | D25 | D50 | | |
| A | 136 | 13500 | 1.5 | 20 | 48 | 66 | 96 | 3.78 | 300 |
| B | 133 | 13500 | 3.5 | 26 | 52 | 74 | 109 | 3.16 | 348 |
| C | 137 | 12200 | 3.5 | 42 | 62 | 87 | 129 | 3.12 | 329 |
| D | 136 | 15000 | 5.5 | 14 | 49 | 69 | 102 | 3.34 | 368 |
| E | 155 | 12200 | 5.5 | 39 | 63 | 89 | 133 | 2.98 | 348 |
| Comp. Cell | 100 | 5200 | 1.5 | 81 | — | | 290 | 2.9 | 100 |

Notes:
[1] The zinc powder used in test alkaline cells A-E were made exclusively by the improved atomization process of the invention. This zinc powder as used in test cells A-E contained less than 1 percent by weight zinc particles which had size greater than about 510 micron and as indicated at least some of the zinc particles had a size of 60 microns or smaller or 50 microns or smaller or 30 microns or smaller. (For example, a D1 designation of 20 micron as in Test Cell A indicates that less than 1 percent by weight of the zinc particles as made by the process of the invention had a particle size less than 20 micron.)

As may be seen from Table 1 the disk (FIG. 2) rotational speed when increased to a level of about 12000 to 13500 rpm in combination with a chamber oxygen content of between about 1.5 and 5.5 vol. % produced a zinc powder which gave improved alkaline cell performance. The higher disk speed in combination with the above indicated chamber oxygen content between about 1.5 and 5.5 vol % produced a zinc powder with smaller median $D_{50}$ particle size compared to conventional battery grade zinc powder which had a much higher median, $D_{50}$, particle size of about 290 micron. Secondary zinc properties resulting from the improved process of the invention besides smaller particle size, per se, may also be contributing to the improved alkaline cell performance. Such secondary properties of the zinc product may include factors such as particle shape distribution, average BET surface area (cm$^2$/g), as well as particle surface texture and surface morphology.

CONCLUSION

The atomization process of the invention utilizing higher level of disk rotation speed between about 12000 to 14000 rpm in combination with chamber oxygen of between about 1.5 and 5.5 vol % resulted in a zinc powder of lower $D_{50}$ median particle size. Such zinc powder produced better alkaline cell high rate discharge performance compared to the same cell using zinc powder which was made at lower disk rotation speed of about 5200 rpm.

It will be appreciated that although the test results were with respect to an AA cylindrical size alkaline cell, the invention is not intended to be restricted to this cell size. The cell 610 shown in FIG. 4 can be an AA cell or other size as well. Thus, the alkaline cell shown in FIG. 4 is representative and is not intended to be restricted to any particular size. The cell shape is typically cylindrical but may be other shapes, for example, having one or more sides which are substantially flat. Thus, by way of example, the cell may have a prismatic or rectangular (cuboid) shape. Cylindrical alkaline cell sizes may typically be standard AAAA (42×8 mm), AAA (44×10 mm), AA (50×14 mm), C (49×25 mm) and D (58×32 mm) size. The zinc powder as produced by the atomization process of the invention is suitable for use in alkaline cell anodes, particularly alkaline cells having an anode comprising zinc and a cathode comprising MnO$_2$. The zinc powder produced by the atomization process of the invention, may also be used effectively in other alkaline cells, for example, in alkaline cells having a anode comprising zinc and a cathode comprising nickel oxyhydroxide.

Although the invention has been described with reference to specific embodiments, it should be appreciated that other embodiments are possible without departing from the concept of the invention. Thus, the invention is not intended to be limited to the specific embodiments, but rather its scope is reflected by the claims and equivalents thereof.

What is claimed is:

1. A centrifugal atomization process for producing a zinc powder from molten zinc comprising the steps of:

a) injecting a stream of molten zinc onto a surface of a disk spinning at a rate of between about 10,000 and 15,000 revolutions per minute within a substantially closed chamber, wherein said chamber has an atmosphere therein having an oxygen content of between about 1 and 6 percent by volume, wherein a mass of molten zinc forms as a film on a surface of said spinning disk;

b) ejecting said film of molten zinc from said spinning disk by the action of centrifugal force caused by said spinning disk, whereupon liquid droplets of molten zinc form in said chamber; and c) cooling said liquid droplets of molten zinc within said chamber thereby forming a particulate zinc powder, d) adding enough zinc fines of 200 mesh size or smaller to the zinc powder from step (c) to produce a final zinc powder having between about 10 and 50 percent by weight zinc particles of 200 mesh size or smaller.

2. The process of claim 1 wherein said disk is spinning at a rate of between about 12,000 and 14,000 revolutions per minute.

3. The process of claim 1 wherein said atmosphere has an oxygen content of between about 1.5 and 5.5 percent by volume.

4. The process of claim 1 wherein said atmosphere has an oxygen content of between about 1.5 and 4.5 percent by volume.

5. The process of claim 1 wherein said atmosphere has an oxygen content of between about 4.0 and 4.5 percent by volume.

6. The process of claim 1 wherein said molten zinc contains zero added mercury and zero added lead so that the mercury content and lead content therein are each less than about 100 parts by weight per million parts by weight zinc.

7. The process of claim 6 wherein said molten zinc contains therein between about 50 and 1500 parts by weight indium per million parts by weight zinc.

8. The process of claim 6 wherein said molten zinc contains therein between about 5 and 1000 parts by weight bismuth million parts by weight zinc.

9. The process of claim 6 wherein said molten zinc contains therein between about 5 and 25 parts by weight aluminum per million parts by weight zinc.

10. The process of claim 1 wherein said zinc powder has a particles size distribution between about 60 and 510 micron, wherein at least some of the zinc particles have a size of 60 microns or smaller and less than 1 percent of the zinc particles by weight have a size greater than 510 micron.

11. The process of claim 1 wherein said zinc powder has particle size distribution between about 50 and 510 micron, wherein at least some of the zinc particles have a size of 50 microns or smaller and less than 1 percent of the zinc particles by weight have a size greater than 510 micron.

12. The process of claim 1 wherein said zinc powder has particle size distribution between about 30 and 510 micron, wherein at least some of the zinc particles have a size of 30 microns or smaller and less than 1 percent of the zinc particles by weight have a size greater than 510 micron.

13. A centrifugal atomization process for producing a zinc powder from molten zinc comprising a step of:

a) injecting a stream of molten zinc onto a surface of a disk spinning at a rate of between about 10,000 and 15,000 revolutions per minute within a substantially closed chamber, wherein said chamber has an atmosphere, therein having an oxygen content of between about 1 and 6 percent by volume, wherein a mass of molten zinc forms as a film on a surface of said spinning disk, wherein said disk has a cup shaped cavity therein, said cavity bounded by an open end and opposing closed end and integral side walls therebetween, wherein there is a plurality of baffles extending from said disk side walls and protruding into said cavity, wherein said disk has a top edge surface at the open end of said disk between said disk inside side surface and said disk outside side surface, and wherein atop surface of said baffles is approximately level with said disk top edge surface, when the disk is viewed with the open end on top.

14. The process of claim 13 wherein the disk has a substantially cylindrical shape and said baffles are an integral portion of said disk.

15. The process of claim 13 wherein said disk has an open end and opposing closed end and integral side walls therebetween, wherein the integral side walls of said disk has an inside side surface facing the disk interior and an outside side surface facing the external environment.

16. The process of claim 15 wherein said inside side surface of said disk forms the side walls of said cavity and at least a portion of the open end of said disk and the open end of said cavity coincide.

17. The process of claim 13 wherein said disk top edge surface is exposed to the environment external to said disk.

18. The process of claim 13 wherein the baffles have substantially straight side walls and a substantially flat top surface therebetween, when the disk is viewed with the open end on top.

19. The process of claim 18 wherein the baffles are substantially in the shape of a triangular prism.

20. The process of claim 13 wherein the baffles have at least one curved side surface, when viewed with the open end of the disk on top.

21. The process of claim 20 wherein the baffles each have a pair of opposing curved side surfaces, wherein one side surface has a convex shape and the opposing side surface has a concave shape when each surface is viewed directly from a point outside the baffle.

22. The process of claim 21 wherein the baffles are all oriented within the disk cavity so that said baffles all appear curved inwardly in the same direction, either clockwise or counterclockwise, when the disk is viewed with the open end on top.

23. The process of claim 13 wherein the top surface of said baffles is located below said disk top edge surface, when the disk is viewed with the open end on top.

24. The process of claim 23 wherein the baffles have substantially straight side walls, when the disk is viewed with the open end on top.

25. The process of claim 23 wherein the baffles have at least one curved side surface, when viewed with the open end of the disk on top.

26. The process of claim 25 wherein the baffles each have a pair of opposing curved side surfaces, wherein one side surface has a substantially convex shape and the opposing side surface has a substantially concave shape when viewed from a point outside the baffle and facing the respective side surfaces.

27. A centrifugal atomization process for producing a zinc powder from molten zinc comprising the steps of:

a) injecting a stream of molten zinc onto a surface of a disk spinning at a rate of between about 10,000 and 15,000 revolutions per minute within a substantially closed chamber, wherein said chamber has an atmosphere therein having an oxygen content of between about 1 and 6 percent by volume, wherein a mass of molten zinc forms as a film on a surface of said spinning disk;

b) ejecting said film of molten zinc from said spinning disk by the action of centrifugal force caused by said spinning disk, whereupon liquid droplets of molten zinc form in said chamber; and c) cooling said liquid droplets of molten zinc within said chamber thereby forming a particulate zinc powder, d) adding enough zinc fines of 325 mesh size or smaller to the zinc powder from step (c) to produce a final zinc powder having between about 10 and 50 percent by weight zinc particles of 325 mesh size or smaller.

28. A centrifugal atomization process for producing a zinc powder from molten zinc comprising a step of injecting a stream of molten zinc onto a surface of a disk spinning at a rate of between about 10,000 and 15,000 revolutions per minute within a substantially closed chamber, wherein said chamber has an atmosphere therein having an oxygen content of between about 1 and 6 percent by volume, wherein a mass of molten zinc forms as a film on a surface of said spinning disk, wherein said disk has a cup shaped cavity therein, said cavity bounded by an open end and opposing closed end and integral side walls therebetween, wherein there is a plurality of baffles extending from said disk side walls and protruding into said cavity, wherein said disk has a top edge surface at the open end of said disk between said disk inside side surface and said disk outside side surface, and wherein a top surface of said baffles is located below said disk top edge surface when the disk is viewed with the open end on top.

29. The process of claim 28 wherein the baffles have substantially straight side walls when the disk is viewed with the open end on top.

30. The process of claim 28 wherein the baffles have at least one curved side surface when the disk is viewed with the open end on top.

31. The process of claim 28 wherein the baffles each have a pair of opposing curved side surfaces, wherein one side surface has a substantially convex shape and the opposing side surface has a substantially concave shape when viewed from a point outside the baffle and facing the respective side surfaces.

\* \* \* \* \*